Dec. 15, 1942.   C. A. HAMMER   2,305,001
METHOD OF MAKING OILLESS BEARINGS
Filed March 27, 1941

INVENTOR.
Chester A. Hammer
BY Brown, Critchlow & Flick
his Attorneys.

Patented Dec. 15, 1942

2,305,001

UNITED STATES PATENT OFFICE 2,305,001

METHOD OF MAKING OILLESS BEARINGS

Chester A. Hammer, St. Marys, Pa., assignor to Stackpole Carbon Company, St. Marys, Pa., a corporation of Pennsylvania Application March 27, 1941, Serial No. 385,414

5 Claims. (Cl. 29—149.5)

This invention relates to bearings, and more particularly to oilless bearings.

It has been proposed heretofore to make oilless bearings by providing the bearing surfaces of metal bearings with recesses in which a somewhat plastic lubricating material, such as a graphite composition, is packed. It has also been proposed to cast bearing metal around a cylindrical core encircled by a helical thread of a suitable material impregnated with a lubricant. A thread of substantially pure graphite cannot be used in such a method because of the difficulty of making such a thread and of keeping it from breaking until it is cast into place.

It is among the objects of this invention to provide a method of making an oilless bearing which is simple, rapid and inexpensive, and which permits the bearing surface to be provided with an insert of substantially pure graphite held securely in place.

In accordance with this invention a body of lubricating material is provided on one surface with a projecting portion, and this surface is then covered with bearing material in order to imbed the projecting portion therein. Following this all of the body of lubricating material, except its projecting portion, is removed so as to form a bearing having a bearing surface of bearing material and lubricating material. Preferably, the lubricating material is graphite that has been baked into a rigid body, and the bearing material is any suitable bearing metal that is cast on the graphite body. If the bearing is to be cylindrical or tapered, the graphite body is of the same shape and is most suitably encircled by a thread integral therewith and which remains in the bearing surface of the bearing after the rest of the body has been removed.

Figure 1:
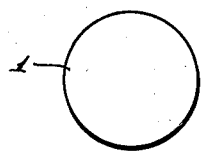
Figure 2:
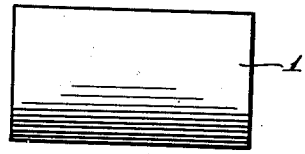
Figure 3:
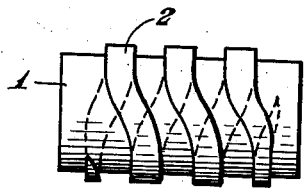
Figure 4:
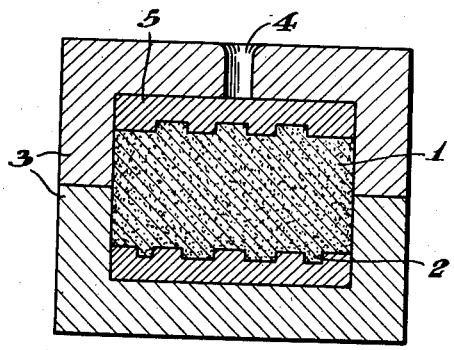
Figure 5:
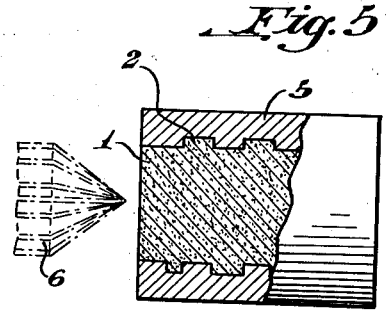
Figure 6:
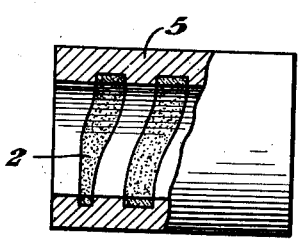
Figure 7:
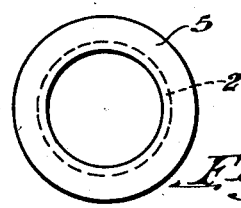

The invention is illustrated in the accompanying drawing in which Fig. 1 is an end view of a solid cylinder of lubricating material, such as graphite; Fig. 2 is a side view thereof; Fig. 3 is a side view of the cylinder after a thread has been cut in its periphery; Fig. 4 is a longitudinal section through the threaded cylinder about which bearing metal has been cast in a mold; Fig. 5 is a side view, partly broken away, of the unfinished bearing after it has been removed from the mold; Fig. 6 is a view similar to Fig. 5 showing the finished bearing; and Fig. 7 is an end view of the finished bearing.

Referring to Figs. 1 and 2 of the drawing, lubricating material of suitable character is formed into the shape of a cylindrical body 1 that is most conveniently solid. Preferably, the material is finely divided particles of graphite mixed with just enough powdered bonding material, such as a resin, to bind the graphite particles together after the mixture has been molded into shape and baked to form a hard body. A thread 2 is then cut in the periphery of the cylinder as shown in Fig. 3. Or, if desired, the thread can be formed in the molding process before the cylinder is baked.

As shown in Fig. 4, the threaded cylinder is then centered in any suitable manner in a mold 3 having a cavity with which a passage 4 communicates. Bearing material 5, preferably metal such as copper, bronze, or any other suitable bearing metal, is poured in a molten state into the mold through its passage 4 until the metal encircles the threaded graphite core therein and completely fills the mold cavity. The molten metal flows between the threads of the graphite cylinder whereby they become embedded in the metal. The hot metal also penetrates the surface pores of the threads so that the metal and threads are securely bonded when the metal cools.

After the metal has solidified, the mold is opened and the bearing unit is removed. It then has the appearance shown in Fig. 5 in which a graphite core is encircled by a metal sleeve. A suitable tool 6, such as a drill or milling tool indicated in broken lines, is then passed through the center of the bearing unit to remove all of the graphite core except its thread. This operation therefore exposes the inner surface of the metal sleeve and forms a cylindrical bearing surface made of metal and the helical thread 2 of graphite embedded in it, as shown in Figs. 6 and 7.

The simplicity and relative inexpensiveness of this method of making an oilless bearing will be obvious. Moreover, the resulting bearing is durable and provided with a lubricating material of superior qualities that is securely held in the bearing surface.

According to the provisions of the patent statutes, I have explained the principle and construction of my invention and have illustrated and described what I now consider to represent its best embodiments. However, I desire to have it understood that, within the scope of the appended claims, the invention may be practiced otherwise than as specifically illustrated and described.

I claim:

1. The method of making an oilless bearing, comprising forming a unitary body of lubricating material provided on one surface with a projecting portion, covering said surface with bearing material with said projecting portion embedded therein, and then removing all of said body of lubricating material except its said projecting portion to thereby form a bearing having a bearing surface of bearing material and lubricating material.

2. The method of making an oilless bearing, comprising forming a hard unitary body of lubricating material provided on one surface with a thread integral therewith, casting bearing material around said body whereby to embed said thread therein, and then removing all of said body of lubricating material except its thread to thereby form a bearing having a bearing surface of bearing material and a thread of lubricating material.

3. The method of making an oilless bearing, comprising forming a baked body of graphite encircled by a thread integral therewith, encircling said threaded body with a plastic sleeve of thermo-plastic bearing material that embeds said thread therein, permitting said material to set, and then removing from said sleeve all of said body of graphite except its thread to thereby form a bearing provided with an inner surface of bearing material and a thread of lubricating material.

4. The method of making an oilless bearing, comprising molding graphite into the form of a body that is circular in cross section, baking said body, cutting a thread in the periphery of the body, casting metal around the circumference of said body in engagement with its surface to form a metal sleeve in which said thread is embedded, and then removing from said sleeve all of said body except its thread whereby a bearing is formed having an inner surface of metal and a graphite thread.

5. The method of making an oilless bearing, comprising molding graphite into the form of a body encircled by a thread integral therewith, baking the threaded body, casting metal around the circumference of said body in engagement with its surface to form a metal sleeve in which said thread is embedded, and then removing from said sleeve all of said body except its thread whereby a bearing is formed having an inner surface of metal and a graphite thread.

CHESTER A. HAMMER.